Patented Aug. 8, 1933

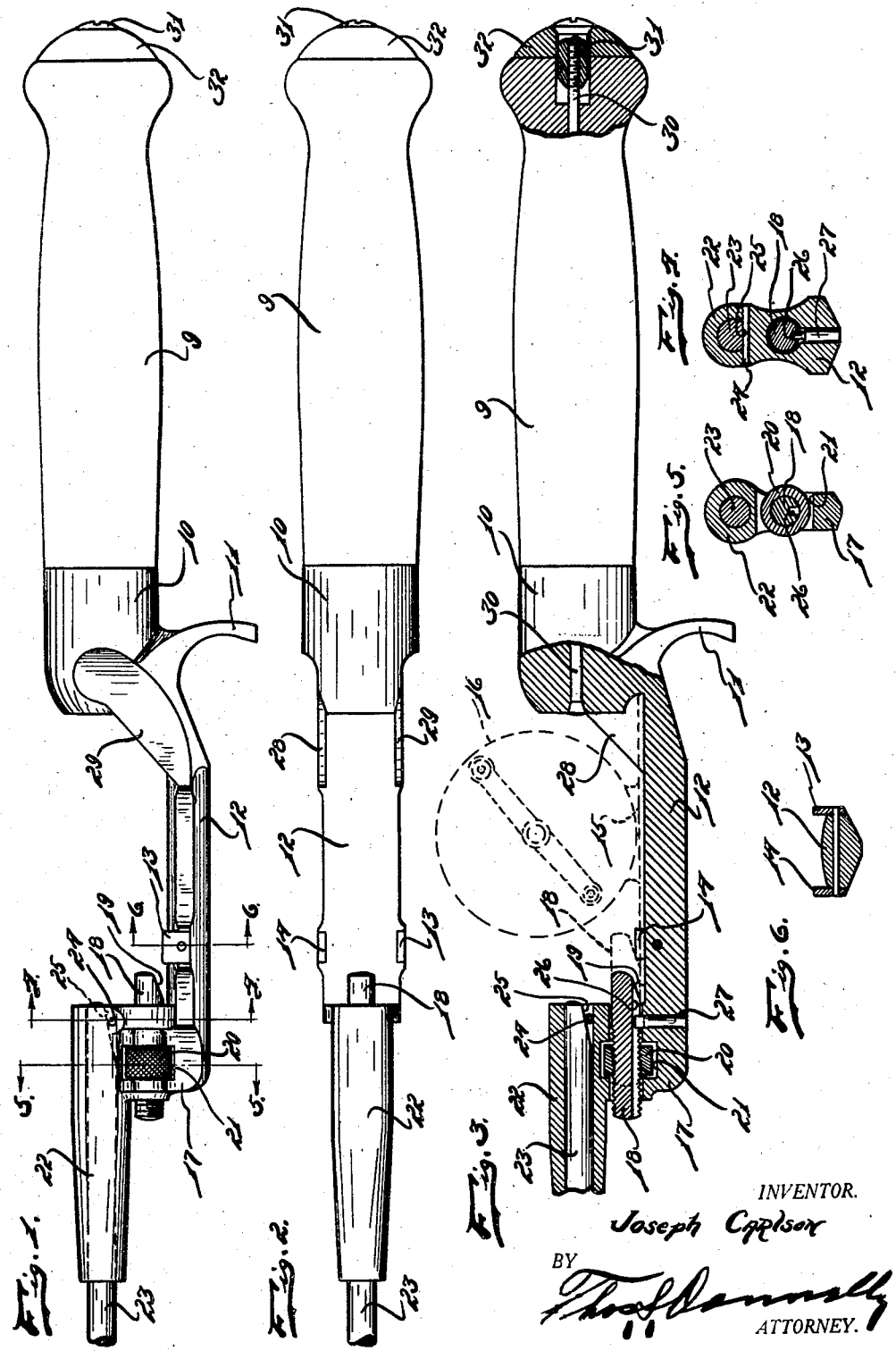

1,920,966

UNITED STATES PATENT OFFICE 1,920,966

FISHING POLE

Joseph Carlson, Detroit, Mich.

Application November 11, 1929
Serial No. 406,208

4 Claims. (Cl. 43—22)

My invention relates to a new and useful improvement in a fishing pole and particularly the means for attaching the rod portion to the handle and of fastening the reel on the handle.

It is an object of the present invention to provide a fishing pole with a rod detachable from the handle and so fastened thereto that when it is in use its rotation is prevented.

Another object of the invention is the provision of novel means for attaching the reel to the handle whereby the same may be easily and quickly attached and securely locked in position when in use.

Another object of the present invention is the provision of a device of this class which will be simple in structure, economical of manufacture and highly efficient in use.

Other objects will appear hereinafter.

The invention consists in the combination and arrangement of parts hereinafter described and claimed.

The invention will be best understood from a reference to the accompanying drawing which forms a part of this specification and in which, Fig. 1 is a side elevational view of the invention, Fig. 2 is a top plan view of the invention, Fig. 3 is a longitudinal, central sectional view of the invention, Fig. 4 is a sectional view taken on line 4—4 of Fig. 1, Fig. 5 is a view taken on line 5—5 of Fig. 1, Fig. 6 is a view taken on line 6—6 of Fig. 1.

The invention comprises a handle 9 fastened to a metallic shoulder 10 by means of a rod 30 projected through the shoulder 10, the handle 9 and the end cap 32. A nut 31 is threaded upon the end of the rod.

A finger grip 11 projects outwardly from the shoulder 10. A resting body 12 extends from the shoulder 10 and is provided with guide strips 13 and 14 at opposite sides for guiding and engaging opposite sides of the plate 15 of the reel 16.

A boss or enlargement 17 projects outwardly from the body 12. A barrel 22 extends outwardly from the boss 17. Formed through the boss 17 parallel to the axis of the barrel 22 and positioned below said barrel is a bore which intermediate its ends opens into a slot or recess 21. A threaded stem 18 is positioned in the bore and threaded on this threaded stem is a nut 20 which engages in the slot or recess 21 so that upon rotation of the nut the stem 18 may be moved axially. The under surface of the stem 18 at one end thereof is cut away to provide a flat surface 19. Engaged in the barrel 22 is one end of the rod 23 which has its under surface cut away at one end to provide a flat portion 25 which engages a pin 24 projected through the barrel adjacent one side. The engagement of the pin 24 with the flat portion 25 prevents rotation of the rod in the barrel, so that the line may always be kept in proper alignment with the reel and its tangling on the rod prevented.

When it is intended to place the reel in position, the stem 18 will be retracted and when the reel has been placed in position a part of the plate 15 will extend into a socket formed in the shoulder 10, and the threading of the nut will then force the stem outwardly so as to engage against the plate 15 and lock the same in position, the flat surface 19 engaging the upper surface of the plate 15. A pin 27 which engages in a groove 26 formed in the stem 18 prevents its rotation. Guide plates 28 and 29 are positioned at opposite sides of the shoulder 10 and project outwardly therefrom to serve as guides for placing the reel plate 15 in position.

With a fishing rod handle constructed in this manner a most efficient structure is provided and one which will afford a maximum amount of comfort and pleasure to the user.

While I have illustrated and described the preferred form of construction I do not wish to limit myself to the precise details of structure shown but desire to avail myself of such variations and modifications as come within the scope of the appended claims.

Having thus described my invention, what I claim is new and desire to secure by Letters Patent is:

1. In a fishing pole: a handle; a rod receiving barrel mounted on said handle; a rod projected into said barrel and having a flat inclined portion adjacent its end; and means mounted on said barrel engageable with said flat portion for preventing rotation of said rod in said barrel.

2. In a fishing pole: a rod receiving barrel having a passage therein for reception of a rod; a pin projected transversely across said passage; a rod projected into said passage and having a flat inclined portion engageable with said pin for preventing rotation of said rod.

3. In a fishing pole: a reel supporting body; a shoulder at one end of said body provided with a recess for the reception of one end of a reel plate; a boss at the opposite end of said body and having a bore formed there-through and opening intermediate its ends into a slot extending laterally through the boss; a threaded member engaged in said bore and having an inclined flat surface on one end; and a nut positioned in said slot and threaded on said threaded member for effecting, upon rotation, axial movement of said threaded member in the bore into and out of engagement with the opposite end of the reel plate.

4. In a fishing pole: a reel supporting body; a shoulder at one end of said body provided with a recess for the reception of one end of a reel plate; a boss at the opposite end of said body and having a bore formed there-through and opening intermediate its ends into a slot extending laterally through the boss; a threaded member engaged in said bore and having an inclined flat surface on one end; and a nut positioned in said slot and threaded on said threaded member for effecting, upon rotation, axial movement of said threaded member in the bore into and out of engagement with the opposite end of a reel plate, said threaded member having a longitudinally extending groove formed on its under surface; and a pin mounted in said body and projecting into said grove for preventing rotation of said threaded member.

JOSEPH CARLSON.